(12) United States Patent
Ward

(10) Patent No.: US 6,899,124 B1
(45) Date of Patent: May 31, 2005

(54) ANTIFREEZING GUARD

(76) Inventor: Gerald E. Ward, 91 S. Wellington, Runny Meade Estate, O'Fallon, MO (US) 63366

( * ) Notice: Subject to any disclaimer, the term of this patent is extended or adjusted under 35 U.S.C. 154(b) by 0 days.

(21) Appl. No.: 10/624,834

(22) Filed: Jul. 22, 2003

Related U.S. Application Data

(63) Continuation-in-part of application No. 10/411,936, filed on Apr. 11, 2003.

(51) Int. Cl.$^7$ .............................................. F16K 49/00
(52) U.S. Cl. ...................... 137/338; 137/375; 138/158; 285/47; 165/45
(58) Field of Search ................................ 137/338, 375; 138/155, 158, 149; 285/47; 165/45

(56) References Cited

U.S. PATENT DOCUMENTS

| 70,365 A | 10/1867 | Russell ......................... 138/32 |
|---|---|---|
| 165,550 A | 7/1875 | Dietz ........................... 138/32 |
| 2,189,466 A | 2/1940 | Huth ............................ 138/32 |
| 2,595,408 A | 5/1952 | Quest ........................... 405/40 |
| 3,044,915 A * | 7/1962 | Jacobsen .................... 137/375 |
| 3,304,005 A | 2/1967 | Lytle, Sr. et al. ............. 237/30 |
| 3,819,209 A | 6/1974 | Anderson et al. ............. 285/73 |
| 3,832,525 A | 8/1974 | Stanton et al. .............. 392/468 |
| 4,124,179 A | 11/1978 | Powell et al. ................. 237/28 |
| 4,696,324 A * | 9/1987 | Petronko ..................... 137/375 |
| 4,726,394 A * | 2/1988 | Devine ........................ 137/341 |
| 4,735,235 A | 4/1988 | Anderson et al. ........... 138/109 |
| 5,025,836 A * | 6/1991 | Botsolas ..................... 138/110 |
| 5,094,273 A | 3/1992 | Eagleton ..................... 138/107 |
| 5,158,114 A * | 10/1992 | Botsolas ..................... 138/149 |
| 5,219,403 A | 6/1993 | Murphy ................... 137/561 A |
| 5,524,669 A * | 6/1996 | Trueb et al. ................. 137/375 |
| 6,019,123 A | 2/2000 | Gibbs .......................... 137/338 |
| 6,206,030 B1 | 3/2001 | Barthuly ..................... 137/341 |
| 6,688,327 B1 * | 2/2004 | Baker .......................... 137/375 |

* cited by examiner

*Primary Examiner*—A. Michael Chambers
(74) *Attorney, Agent, or Firm*—Grace J. Fishel

(57) ABSTRACT

A system and kit for forming an inexpensive protective plenum around pipes and related equipment subject to freezing on a mobile home is disclosed. The system uses thin, flexible material, such as plastic tubes, to form a first protective plenum around the pipes and to connect enclosures around a water box forming a second protective plenum. The first plenum around the pipes may be installed in sections with the sections joined with rings or collars at the joints. The rings and collars may also be formed of inexpensive materials, such as plastics. The second plenum may be connected to the first plenum or to a tube. The first plenum and the tube may be connected to a source of hot air, such as the duct work of the hot air heating system of the home.

7 Claims, 6 Drawing Sheets

ANTIFREEZING GUARD

This application is a continuation-in-part of application Ser. No. 10/411,936, filed Apr. 11, 2003.

BACKGROUND OF THE INVENTION

1. Field of the Invention

The present invention relates to an antifreezing guard for protecting water boxes on a mobile home from freezing.

2. Brief Description of the Prior Art

Water pipes in the unheated space under a mobile home are subject to freezing. Other components of the water service system such as hose bibs and especially water boxes are also subject to freezing. Water boxes are particularly prone to freezing because they are more exposed than the other components of the water service system.

Water pipes in unheated spaces are typically wrapped with an electric heat tape in order to protect them from freezing. It is good practice to turn the heat tape off in the summer to extend the life of the heat tape. With a mobile home, however, the heat tape is usually concealed under a skirt of the trailer and no thought is given to the heat tape until a pipe freezes because the heat tape has burned out. With respect to mobile homes, other devices, such as rigid plenums tapped into a heating duct of a forced air furnace have been suggested for use in keeping water pipes from freezing but no provision was made for heating the water box.

U.S. Pat. Nos. 70,365, 165,550, 2,189,466, 2,595,408, 3,304,005, 3,819,209, 3,832,525, 4,124,179, 4,735,235, 5,094,273, 5,219,403, 6,019,123, and 6,206,030 are incorporated by reference herein.

BRIEF SUMMARY OF THE INVENTION

The present invention provides an inexpensive antifreezing guard, which can be provided in kit form, for forming a protective plenum around water boxes subject to freezing. The present invention also provides a method of forming such a plenum. The kit and plenum of the invention is preferably formed of inexpensive materials. The plenum is formed from an enclosure surrounding the water box. The enclosure is connected by a tube to a source of warm air supplied by a heat duct in the mobile home.

The plenum may be formed from sheet stock which is seamed into tubes or boxes at the place of manufacture or molded as a casing. Alternatively, the boxes or tubes may be formed at the place of installation. Premade boxes or tubes are best installed on pipes subject to freezing when the home is first placed on a site but for retrofitting existing structures, boxes or tubes formed at the place of installation may be easier to install.

The tube may be seamed or seamless and formed from sheet stock. If seamed, it may be formed at the place of installation by joining opposite edges of the sheet stock to form the tube. The opposite edges may be joined with an adhesive tape or by applying an adhesive layer at an edge of a sheet which may be overlapped with an opposite edge. Hook and pile fasteners, such as VELCRO brand tape, may be used in place of adhesive. The tape or adhesive may be applied at the place of installation of the plenum of the invention or at a separate location and protected by a strip sheet until the time of installation.

The tubes may be installed in sections and the sections intermediated by collars or rings. The enclosure around the water box is attached to a hot air source at the place of installation by the tube. The hot air loosely inflates the tube and forms a warm air blanket around the water box in the enclosure and protects it from freezing.

In view of the above, it is an object of the present invention to provide an inexpensive protective plenum around a water box subject to freezing. It is another object to provide the plenum in kit form for installation on new or existing water boxes subject to freezing. Other objects and features of the invention will be in part apparent and in part pointed out hereinafter.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
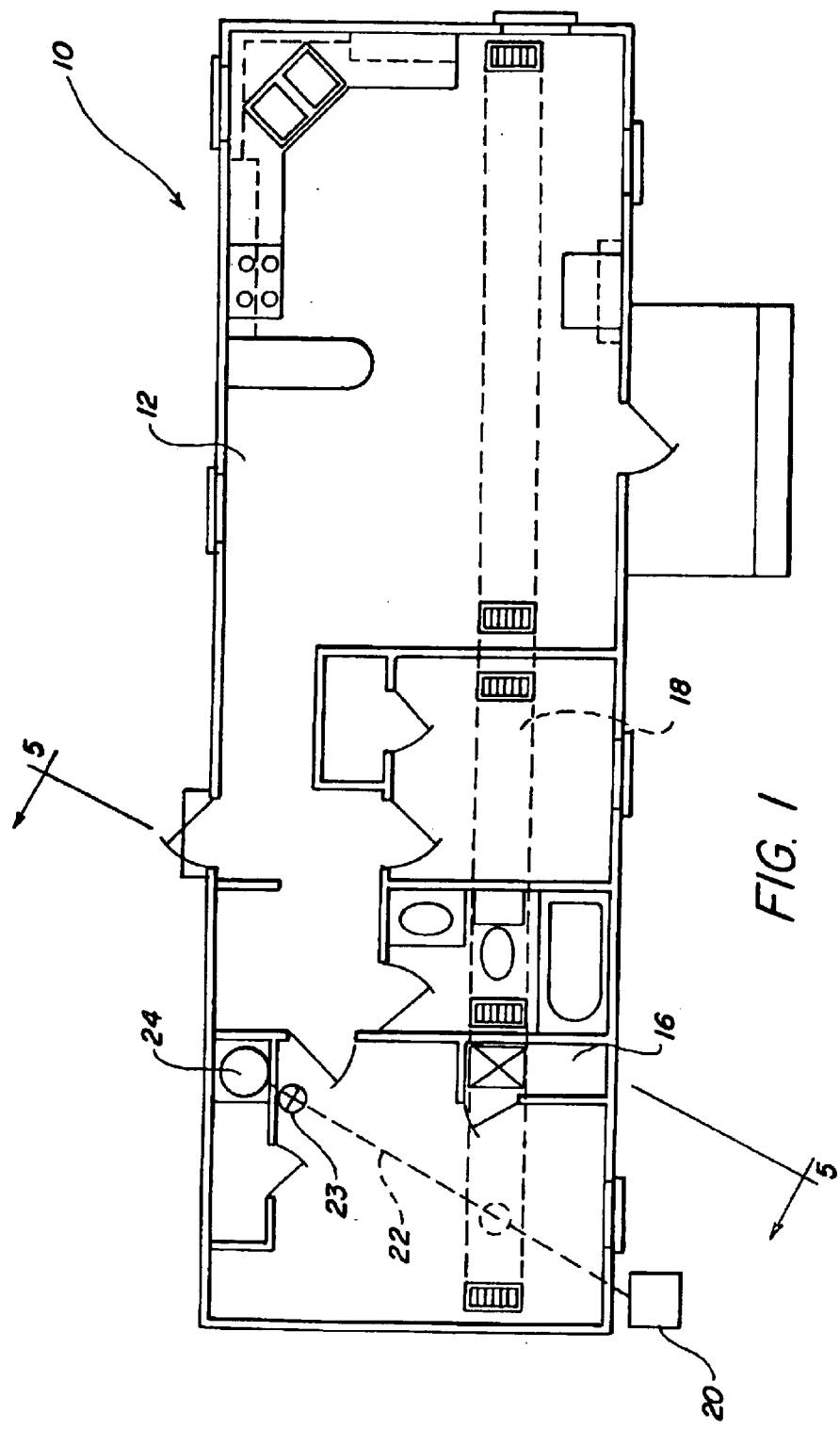
FIG. 1 is a top plan view, in schematic, of the floor layout of a typical mobile home.
Figure 2:
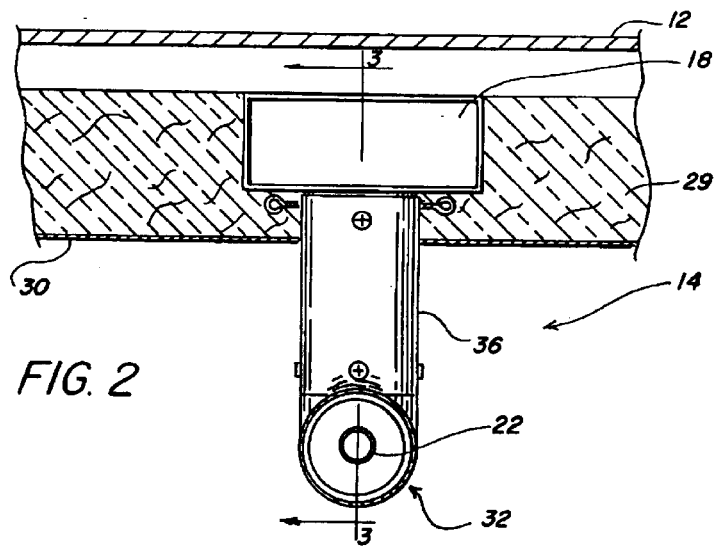
FIG. 2 is a partial cross-sectional view of the device of the invention installed on a water pipe in an unheated crawl space, such as under the mobile home of FIG. 1.

Referring to FIG. 1, a mobile home 10 is shown. Mobile home 10 has a floor 12 and an unheated crawl space 14 under floor 12, as shown in FIG. 2. Mobile home 12 has a forced hot air furnace 16 heating mobile home 10 through a duct work 18, shown in phantom in FIG. 1.

Figure 5:
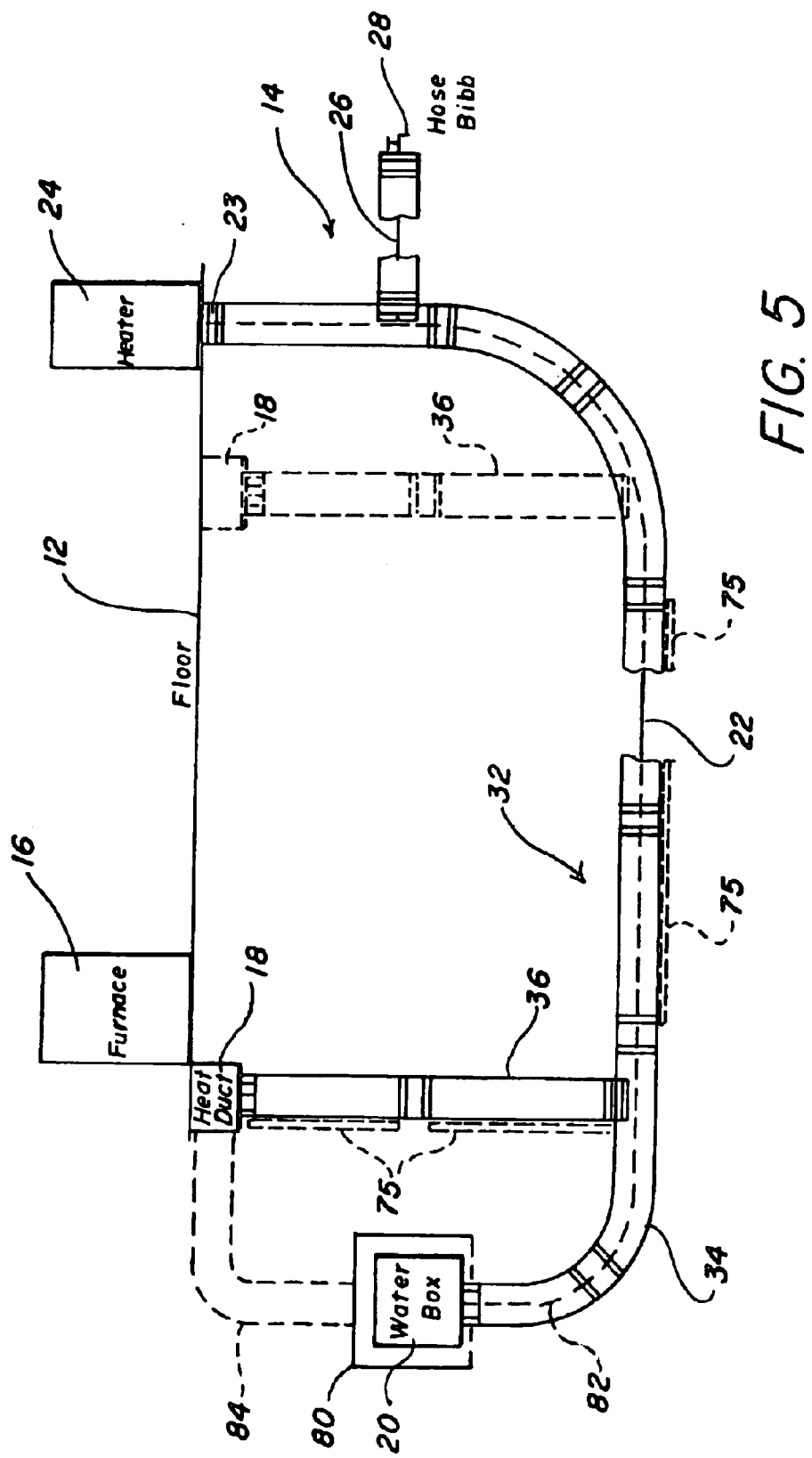
FIG. 5 is a partial cross-sectional view of the device of the invention, in schematic, taken along the plane 5—5 of FIG. 1.

Water is supplied to mobile home 10 from an external water box 20 through a pipe 22, shown in phantom in FIG. 1 and schematically in FIG. 5. Pipe 22 connects to the internal hot and cold water system (not shown) in mobile home 10 at an external water inlet 23 which is usually located near water heater 24, as shown. It will be appreciated that additional water service pipes, such as a service pipe 26 to a hose bibb 28 shown in FIG. 5, are typically included in mobile home 10 or in other dwellings in which the device of the invention may be used.

As shown in FIG. 2, crawl space 14 of mobile home 10 may have an insulating layer 29 under floor 12 over which a vapor barrier layer 30 is installed. Duct work 18 as shown in the drawings is a conventional duct system using rigid ducts, such as sheet metal ducts. It will be appreciated that other duct systems 18 may be used, including flexible and semi-flexible tubular duct systems known in the art.

Figure 3:
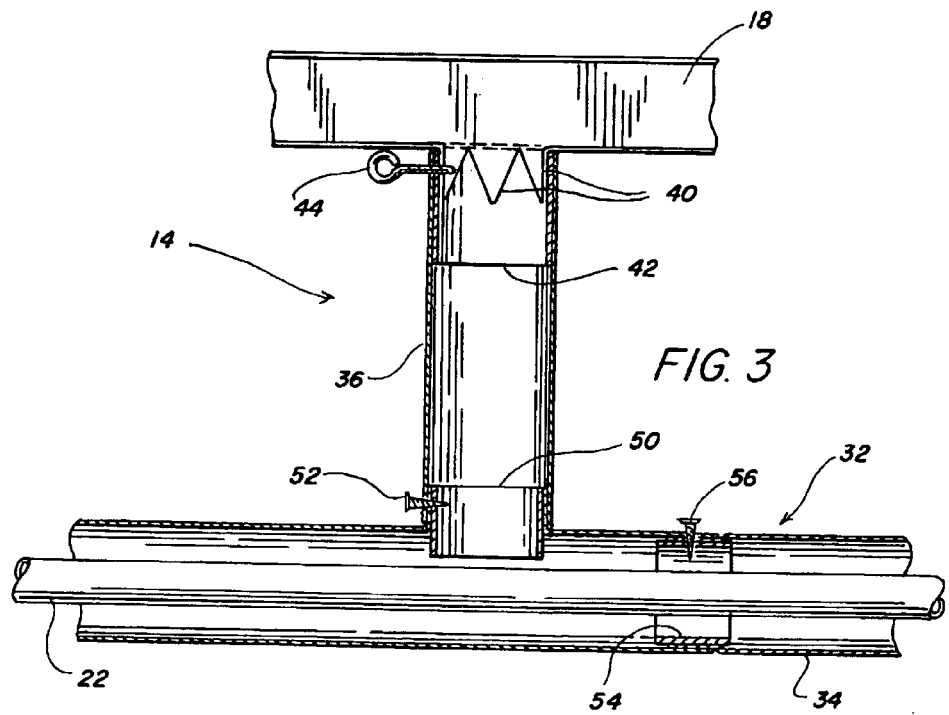
FIG. 3 is a partial cross-sectional view of the device of the invention taken along the plane 3—3 of FIG. 2.
Figure 4:
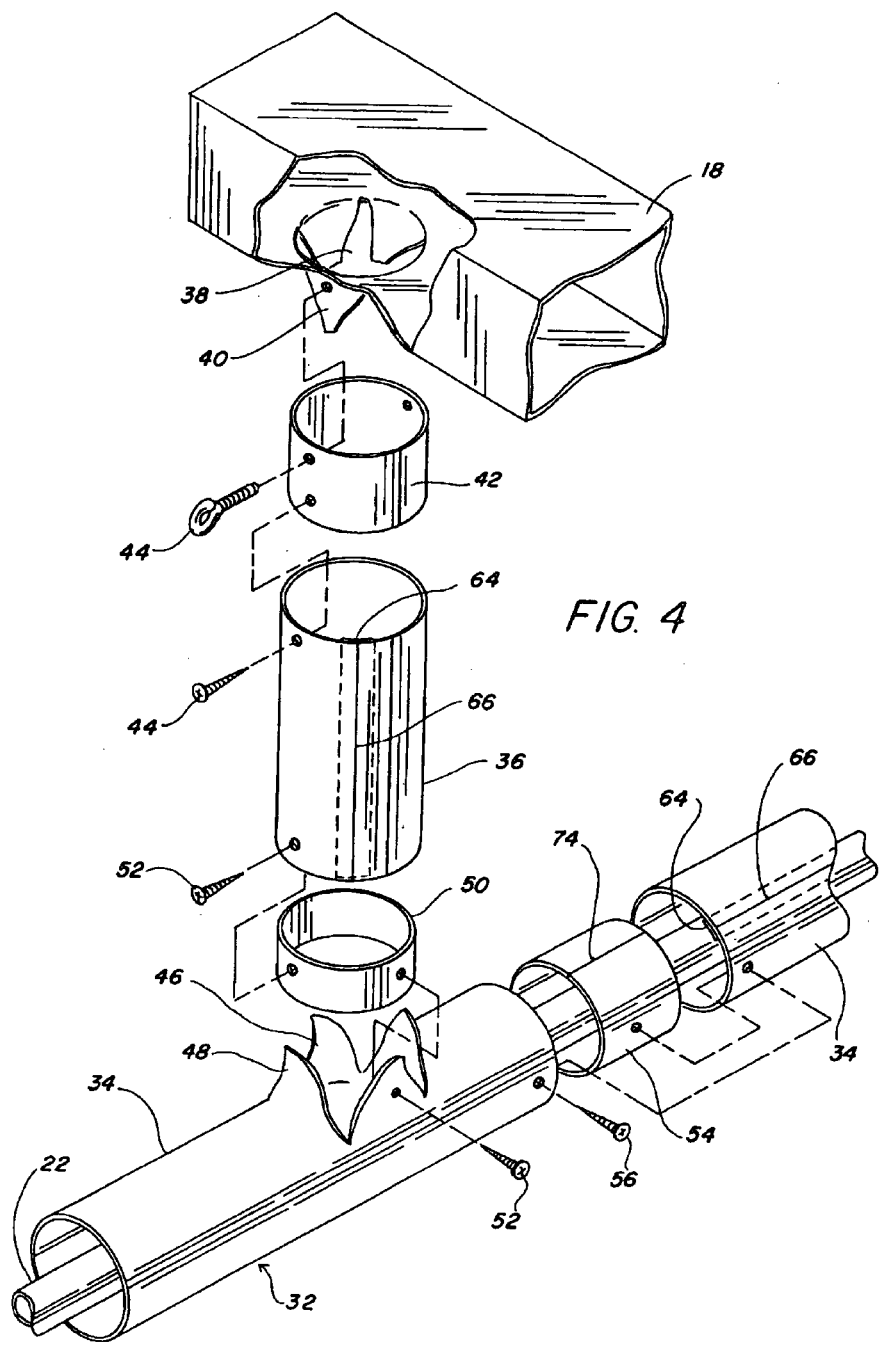
FIG. 4 is a partial, exploded, perspective view of the device of the invention installed on a water pipe in an unheated crawl space, such as under the mobile home of FIG. 1.

Referring to FIGS. 2 through 4, a protective plenum 32 for water pipe 22, and other pipes 26 for mobile home 10, is constructed of thin, flexible plastic tubes 34. Tubes 34 may be seamless, but for some installations it is preferred that they be seamed. In a completed installation tubes 34 are installed around pipes 22 and 26, as shown in FIGS. 2 through 5. Tubes 34 about pipe 22 are connected to hot air duct 18 by a tube 36 which extends upwardly from one of tubes 34. As shown in FIG. 5, tube 34 around pipe 22 may be connected to heat duct 18 by more than one tube 36.

Hot air duct 18 may be joined to tube 36 by cutting slits 38 in hot air duct 18, as shown, and bending down tabs 40. Tabs 40 are arranged in an approximately circular configuration, as shown, and mated with a collar or ring 42. Flexible tube 36 is installed over collar 42 and tabs 40 and joined using suitable fasteners such as screws 44.

Tube 36 is joined to tube 34 by cutting slits 46 in tube 34 and bending up tabs 48. Tabs 48 are arranged in an approximately circular configuration, as shown, and mated with a collar or ring 50. Flexible tube 36 is installed over collar or ring 50 and tabs 48. Flexible tube 36, tabs 48 and collar or ring 50 are joined, as shown, using suitable fasteners such as the screws 52. Depending on the distance between collars or rings 42 and 50, additional, spaced apart collars or rings may be provided for support of flexible tube 36.

Flexible tube 34 is installed over the pipes, such as pipe 22, typically in sections as shown. The sections of flexible tubing 34 are joined by a collar or ring 54 which is mated to the ends of adjacent sections of flexible tubing 34, as shown in FIGS. 3 and 4. The joint of flexible tubing 34 and collar or ring 54 is fixed by suitable fasteners, such as screws 56. Depending on the length of the section, intermediate, spaced apart collars or rings may be provided in flexible tubing 34 for support.

When installed on a system of pipes, such as pipes 22 and 26, and connected to a hot air duct such as duct 18, flexible tubes 34 and 36 form protective plenum 32 for the system of pipes. The pressure of the forced air from furnace 16 inflates flexible tubes 34 and 36 like a low pressure balloon and sections of flexible tubes 34 and 36 may not require additional internal or external collars or rings between the joints. A return duct to the hot air system is not needed. The air leakage from the joints of tubes 34 and 36 permits sufficient air flow through plenum 32 to maintain a hot air barrier around pipes 22 and 26, and other pipes in plenum 32. The heat loss from plenum 32 is negligible and most of the hot air that is lost is leaked into crawl space 14 where it may provide some warming effect to floor 12 of mobile home 10.

As described above, the elements of plenum 32 are joined by screws 44, 52 and 56. It will be appreciated, however, that other conventional fastening methods and devices may be used. For example, nails, rivets, staples, welds, adhesives and tapes may be used.

Plenum 32 may be constructed of tubes 34 and 36 which are seamless tubes formed preferably of a inexpensive, thin, flexible material. Seamless tubes 34 and 36 are easily installed when mobile home 10 is placed on a site. However, for retrofit installation, it may be more convenient to use seamed tubes 34 and 36.

Figure 6:
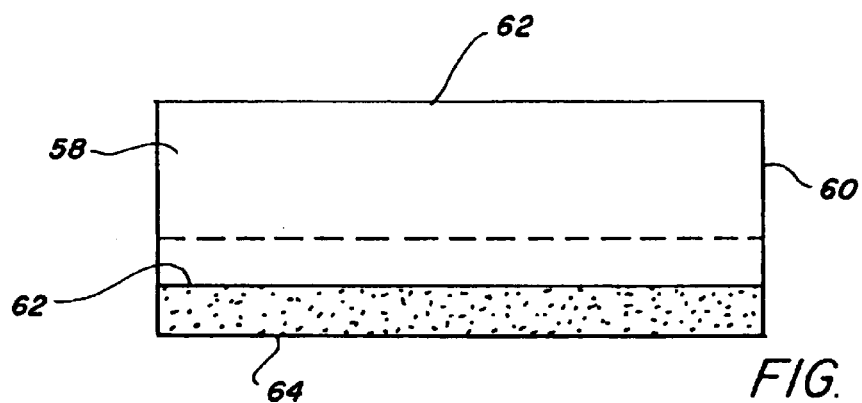
FIG. 6 is a top plan view of a flexible sheet of the invention used to construct the flexible plenum of the invention.
Figure 7:
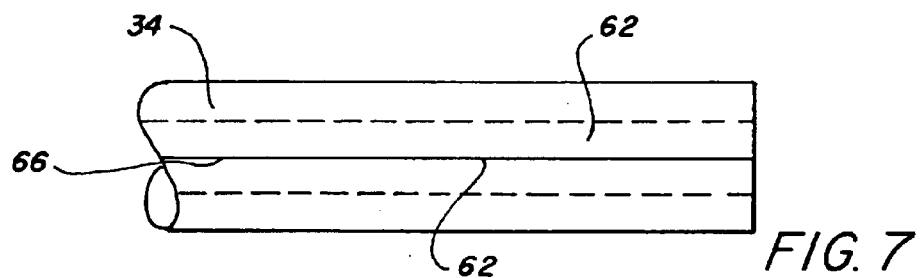
FIG. 7 is a front view of the sheet of FIG. 6 formed into a tubular plenum of the invention.

Seamed tubes 34 and 36 are also formed of inexpensive, thin, flexible material. The material for tubes 34 and 36 is cut to form sheets 58 which have a short side 60 sized to the circumference of the tubes 34 and 36, for example from about six to fifteen inches, with about twelve inches being preferred. The long sides 62 of tubes 34 and 36 may be joined on site, or where manufactured, using a tape 64, shown in FIG. 6. Tape 64 may be adhesive and installed on sheets 58 at the place of manufacture or installed at the work site. FIG. 7 shows sheet 58 formed into tube 34 with long sides 62 joined into a seam 66 by adhesive tape 64, placed on the inside of tube 34. It will be appreciated that tube 34 may be formed with tape 64 on the outside of tube 34. Hook and pile fasteners such as VELCRO brand fasteners may be used in place of adhesive for tape 64.

Figure 8:
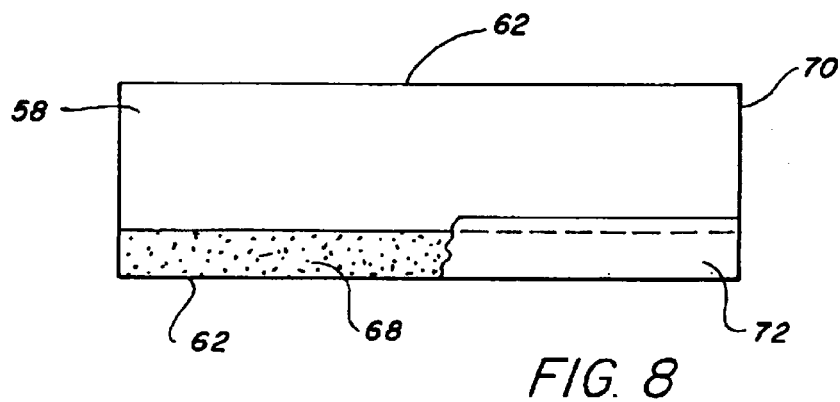
FIG. 8 is an alternative embodiment of the flexible sheet of the invention.

FIG. 8 shows an alternative embodiment of sheet 58. In FIG. 8, sheet 58 has an adhesive layer 68 pre-applied at long side 62, as shown. Short sides 70 of sheet 58 may be lengthened to permit an overlap of long sides 62 to form tube 34 or 36 of the desired circumference. Adhesive layer 68 may be protected until it is used by a strip sheet 72, as may tape 64 of FIGS. 6 and 7 if desired. Sheet 58 of FIG. 8 may be formed into tube 34 or 36 by attaching long side 62 having adhesive layer 68 to its opposite long side 62 to form an overlapped seam.

It will be appreciated that plenum 32 of the invention may be provided to the user in a kit form. This form may be most convenient when plenum 32 is installed as a retrofit to an existing structure, such as mobile home 10. Tubes 34 and 36 may be preformed, but in one preferred embodiment sheets 58 may be provided in standard lengths and cut to size on site. Sheets 58 may be formed into tubes 34 and 36 by wrapping sheets 58 around the existing pipes and joining long sides 62 as described above. This may avoid the need to break the connection in existing water pipes to make the installation. As shown in FIG. 4, rings 54 may be split at 74 and snapped over pipes 22 and 26 by opening split 74 and then releasing it.

It will be appreciated that the plenum of the invention provides a very inexpensive way of protecting pipes from freezing. The materials used are convenient and inexpensive. The sheets and tubes are preferably formed of inexpensive plastic sheet, such as polyethylene, PVC, polypropylene and the like, including fiber reinforced materials. Conventional 0.012 inch seamless plastic tubing is an effective material. Collars or rings 42, 50 and 54 may be formed of inexpensive metal, such as aluminum, or may be formed of plastic materials, such as polyethylene, polypropylene, PVC, or the like. As shown in FIG. 5, a strap 75 may be provided between collars or rings 42 and 50, between collars or rings 54 and between any intermediate collars. The purpose of strap 75 is to space the collars or rings and to keep the tubes from collapsing. Strap 75 may be made of a flexible material like that used for the collars or rings and is attached to the collars or rings.

Referring to FIG. 5, a protective enclosure or plenum 80 is shown for water box 20. Protective enclosure 80 may be formed of inexpensive sheet material and by the methods of construction and joining as disclosed above. In addition to the flexible plastic material disclosed enclosure 80 may be formed of semi-rigid or rigid materials, including plastic, metal or wood. As shown in FIG. 5, protective enclosure 80 may be heated by plenum 32 or by a tube 84 similar to plenum 32. Tube 84 may be identical to plenum 32 or formed of convention plastic dryer vent tubing or drain tubing. Protective enclosure 80 may be used without any additional protective structure for piping 22 of dwelling 10 with a connection to heat duct 18 by connecting tube 84, shown in phantom in FIG. 5. This latter embodiment may be sufficient to protect the water service from freezing, in mild climates in particular, since water box 20 is often the part of the water service that is most vulnerable to freezing.

Figure 9:
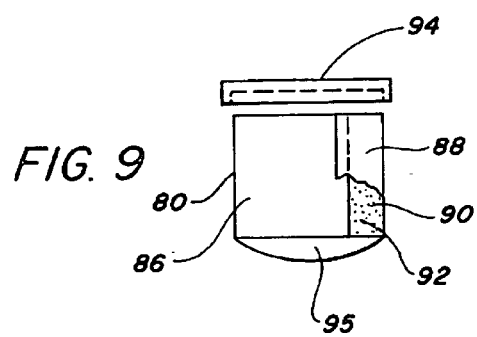
FIG. 9 is a front view of a cylindrical water box enclosure of the invention.

FIG. 9 shows enclosure 80 as cylindirical and formed of a sheet 86 joined by overlapping edges 88 and 90 and securing the joint by an adhesive strip 92, as described previously herein. It will be appreciated that other joining methods, as described herein, including tapes or heat welding, may also be used. A top portion 94 of enclosure 80 may also be attached by the methods described. Cylindrical enclosure 80 may also include flaps or flanges 95 to attach enclosure 80 to a supporting surface.

Figure 10:
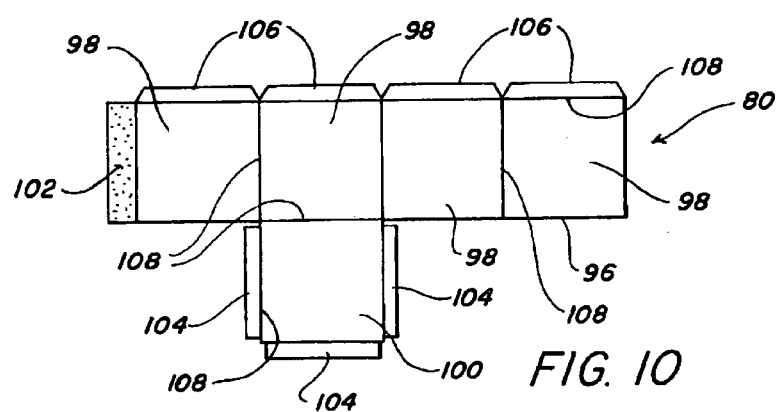
FIG. 10 is a plan view of a blank for a water box enclosure according to the invention.

FIG. 10 shows a blank 96, formed from a sheet, which may be used to form enclosure 80 as a unitary structure for water box 20. Blank 96 has four side panels 98 and a top panel 100, as shown. A terminal side panel 98 may have a glue flap 102, as shown and as previously described, for joining blank 96 into enclosure 80. Top panel 100 may have glue flaps 104, as shown, for joining to side panels 98. Side panels 98 may also have flaps or flanges 106 for attaching the enclosure to a supporting surface. The panels, flaps and flanges of blank 96 may be separated by score lines 108, as is known in the art. It will be appreciated that the elements of blank 96 may be joined by screws, tape or other methods, as described herein.

Figure 11:
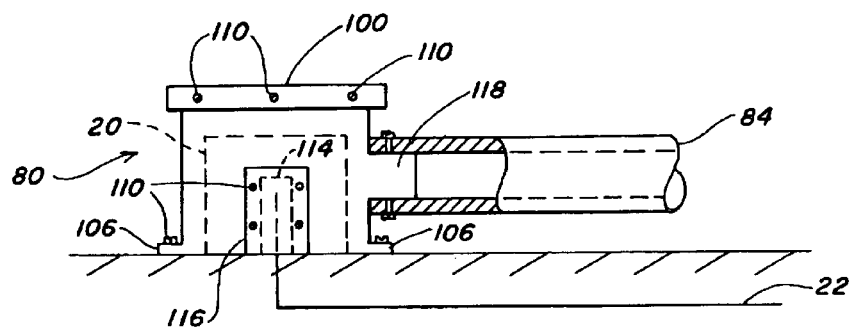
FIG. 11 is a front view of a water box enclosure formed from the blank shown in FIG. 10.

FIG. 11 shows enclosure 80 as formed from blank 96 and installed over water box 20. As shown, the elements of blank 96 are joined by screws 110 and enclosure 80 is fastened to a surface 112 by screws 110. If desired, one of side panels 98 of enclosure 80 may have a slit 114 to facilitate the installation of enclosure 80 on water box 20 and over water line 22. Slit 114 may be closed by a covering 116 of similar material, for example, which may be installed over slit 114 and attached by screws 110, tape, adhesives or other methods described herein.

Enclosure 80 may be attached to plenum 32 or a connecting tube 84 by the methods described herein and as shown in FIGS. 2 through 4. An additional structure for joining elements of the invention is shown in FIG. 11. Plenum 32 or connecting tube 84 may be connected in the system with a flanged coupling 118, shown in cross-section in FIG. 11. Flanged coupling 118 may be attached, to enclosure 80 for example, with the methods disclosed herein, including screws 110. Flanged coupling 1.18 may receive plenum 32 or connecting tube 84, as shown.

It will be appreciated by those skilled in the art that the specific descriptions given herein are illustrative and by way of example. The specific structures disclosed herein may be modified and changed without departing from the spirit of the invention. The invention herein is not to be limited to the specifics of the disclosure, but only by the scope of the appended claims and their equivalents.

What is claimed is:

1. A kit for installing an inflatable protective plenum on pipes subject to freeing and a protective plenum on a water box subject to freezing, said pipes and water box being part of a water system, the kit having thin, flexible tubing, the tubing having a circumference greater than the pipes on which it is to be installed, the thin, flexible tubing being in sections, the kit having rigid, joining elements and fasteners to join adjacent sections of the thin, flexible tubing to the rigid, joining elements with air leakage, the kit having an enclosure with a dimension greater than the water box on which it is to be installed forming a protective plenum about the water box, the kit also having a connecting element to connect the protective plenum about the pipes to a source of warm air to inflate the protective plenum about the pipes and to form a protective barrier of warm air in the protective plenum about the pipes and the kit having a connecting element to connect the protective plenum about the water box to the protective plenum about the pipes without a cold air return in either the protective plenum about the pipes or the protective plenum about the water box.

2. The kit of claim 1 wherein the thin, flexible tubing is formed from a thin, flexible plastic sheet material and the sheet of plastic material has opposed edges, the opposed edges of the sheet of plastic material having attaching structure to attach the edges to each other and form a seamed, thin, flexible tubing.

3. The kit of claim 2 wherein the attaching structure includes an adhesive layer on an edge of the sheet of plastic material.

4. The kit of claim 3 wherein the adhesive layer is protected by a stripable film.

5. The kit of claim 2 wherein the attaching structure includes an adhesive tape.

6. The kit of claim 5 wherein the adhesive tape is protected by a stripable film.

7. The kit of claim 2 wherein the plastic film or sheet is fiber reinforced.

\* \* \* \* \*